(12) United States Patent
Albrecht et al.

(10) Patent No.: US 8,303,191 B2
(45) Date of Patent: Nov. 6, 2012

(54) MULTI-PART AXIAL CAGE FOR A LARGE-DIAMETER ROLLER BEARING

(75) Inventors: Bernhard Albrecht, Herzogenaurach (DE); Reinhard Schwinghammer, Tuchenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 630 days.

(21) Appl. No.: 12/528,902

(22) PCT Filed: Jan. 29, 2008

(86) PCT No.: PCT/EP2008/050993
§ 371 (c)(1),
(2), (4) Date: Aug. 27, 2009

(87) PCT Pub. No.: WO2008/104434
PCT Pub. Date: Sep. 4, 2008

(65) Prior Publication Data
US 2010/0111460 A1  May 6, 2010

(30) Foreign Application Priority Data
Feb. 28, 2007 (DE) .......................... 10 2007 009 811

(51) Int. Cl.
*F16C 33/46* (2006.01)
(52) U.S. Cl. ..................................... 384/572
(58) Field of Classification Search .................. 384/51, 384/455, 561, 572, 574, 576, 590, 591, 593, 384/623; 29/898.061, 898.064, 898.065, 29/898.067
See application file for complete search history.

(56) References Cited

U.S. PATENT DOCUMENTS

| 2,946,633 | A |   | 7/1960 | Göthberg |
| 3,652,141 | A |   | 3/1972 | Husten et al. |
| 4,403,813 | A | * | 9/1983 | Schaefer ...................... 384/450 |
| 4,413,866 | A | * | 11/1983 | Geisey ......................... 384/572 |
| 4,598,957 | A |   | 7/1986 | Shibayama |
| 5,116,146 | A | * | 5/1992 | Stenert ......................... 384/578 |
| 7,637,664 | B2 | * | 12/2009 | Kiyosawa et al. ............ 384/455 |
| 2009/0208161 | A1 | * | 8/2009 | Jauernig et al. .............. 384/572 |

FOREIGN PATENT DOCUMENTS

| DE | 10 07 570 Y | 5/1957 |
| DE | 18 13 565 A | 6/1970 |
| DE | 72 13 160 A | 7/1972 |
| DE | 86 21 532 Y | 12/1987 |
| DE | 44 25 345 Y | 1/1996 |
| DE | 100 10 295 Y | 9/2001 |
| DE | 101 51 263 A | 4/2003 |
| EP | 0 457 020 A | 11/1991 |

* cited by examiner

Primary Examiner — Phillip A Johnson
(74) Attorney, Agent, or Firm — Lucas & Mercanti, LLP; Klaus P. Stoffel

(57) ABSTRACT

A multi-part axial cage for a large diameter roller bearing, which has a metal strip connected to plastic cage windows. The metal strip is configured as a washer-ring-type flat cage and each cage window has a sealing element on the edge lying opposite the guiding edge. The element covering an axial gap is formed between the races of the roller bearing. The sealing elements of the individual cage windows overlap around the circumference.

9 Claims, 8 Drawing Sheets

MULTI-PART AXIAL CAGE FOR A LARGE-DIAMETER ROLLER BEARING

This application is a 371 of PCT/EP2008/050993 filed Jan. 29, 2008, which in turn claims the priority of DE 10 2007 009 811.3 filed Feb. 28, 2007, the priority of both applications is hereby claimed and both applications are incorporated by reference herein.

FIELD OF THE INVENTION

The invention relates to a multi-part axial cage for a large-diameter roller bearing, composed of a metal strip whose side rims, which are of a circular shape, are connected to one another by means of webs, with the result that free spaces are formed into which cage windows composed of a plastic with pockets for receiving rolling bodies are inserted, wherein the cage windows are composed of longitudinal walls which are spaced apart from one another in the circumferential direction and lateral walls which are spaced apart from one another in the radial direction, and the cage windows have grooves which are spaced apart from one another in the radial direction and into which the side rims of the metal strip engage, and the cage windows have securing lugs for securing the rolling bodies, and a guide rim which bears against one of the bearing rings in order to guide the axial cage.

BACKGROUND OF THE INVENTION

A cage, which is embodied according to the generic type for a large-diameter roller bearing, is previously known from EP 0 457 020 A1. The cage for this large-diameter roller bearing is composed of a metal strip, which is provided with recesses. The recesses are of rectangular design. As a result, side webs and intermediate webs are formed on the metal strip. Plastic windows are inserted into these recesses. Said plastic windows have inner walls which engage around the periphery of a recess. Collars which engage over the side webs and bear against the surface of the metal strip adjoin the inner walls.

In this cage according to the generic type, it is disadvantageous that the metal strip and the plastic windows have virtually the same extent in the axial direction, with the result that it is necessary to use a large amount of steel, which in turn results in an undesirably large mass of the cage. It is also disadvantageous that between the raceways of the rolling bodies and the cage there is, in the axial direction, a relatively large open surface, which promotes undesired premature discharge of lubricant from the interior of the bearing.

SUMMARY OF THE INVENTION

Starting from the disadvantages of the known prior art, the invention is therefore based on the object of developing a cage of the generic type for a large-diameter roller bearing in such a way that its weight is reduced and its seal is improved.

This object is achieved according to the invention in accordance with the characterizing part of claim 1 in conjunction with its preamble in that the metal strip is embodied as a flat cage in the form of an annular disk, and the cage windows are each provided, at their end lying opposite the guide rim, with a sealing element which covers an axial gap formed between raceways of the rolling bodies, wherein the sealing elements of the individual cage windows overlap in the circumferential direction.

The advantages achieved with the invention are, in particular, the fact that the cage can easily be manufactured for a large-diameter roller bearing using a small number of components by virtue of the fact that the cage windows are inserted into the flat cage in the form of an annular disk. As a result of the different axial extents of the flat cage in the form of an annular disk and the cage window, it is ensured that a cage which is composed in this way, requires less metal compared to the previously known cages and therefore has a reduced mass, which has a positive effect on the running behavior of a bearing when it is operated. It is also advantageous that damaged cage windows can easily be replaced without problems, with the result that the flat cage in the form of an annular disk can continue to be used. A further significant advantage is that the sealing element of the cage according to the invention covers the axial gap, which is formed by the raceways of the rolling bodies, and the lubricant therefore cannot leave the roller bearing prematurely. Covering the individual sealing elements in the circumferential direction ensures that this seal is particularly effective.

Further advantageous refinements of the invention are described in claims 2 to 9.

For example, it has proven advantageous according to claim 2 if the sealing elements are embodied as rectangular walls which are each provided with a recess at their ends lying opposite one another in the radial direction. This ensures that the bearing is sealed while the configuration of the ends with recesses permits influence to be applied to the capability of the lubricant to pass through the cage.

The features in claim 3, according to which the rectangular wall of one of the cage windows has a radially offset step at one end in the circumferential direction, against which step the rectangular wall of the next cage window comes to bear, with the result that the step and the wall overlap in the circumferential direction, ensure that the multi-part axial cage has a sealing effect over its entire circumferential region.

As is apparent from claim 4, the longitudinal walls of the cage window are each to be provided with one securing lug, which securing lugs lie opposite one another and are intended for positively locking connection to a free space of the flat cage. This snap-action connection implements simple mounting of the cage windows into the recesses of the flat cage, and removal therefrom.

According to a further additional feature in claim 5, the radially inner lateral walls are to be respectively provided with two projections spaced apart from one another at the axially upper end and with two projections spaced apart from one another at the axially lower end. In this way it is in turn possible to influence the capability of lubricant to pass through the cage according to the invention.

It has proven advantageous according to claim 6, if the flat cage in the form of an annular disk is composed of at least two segments which can be connected to one another in a positively locking fashion at their two ends. In this way, it is possible for bearing cages which have large diameters to be transported to the end customer without problems and to be easily assembled by said end customer. In this context it has proven advantageous according to a further feature in claim 7, if each segment has a projection and a recess which correlate with one another.

According to a further additional feature according to claim 8 there is provision that the multi-part axial cages have a different diameter and the circumferential extent of the webs is greater in the radially outer direction than the circumferential extent in the radially inner direction, wherein the geometric dimension of the free spaces of the flat cage and the geometric dimension of the cage windows are always the same irrespective of the diameter of the cage. This means that, for axial cages which differ in diameter, both the free spaces of the flat cage and the cage windows have the same geometric dimension. As a result, in each case just one tool is needed for punching out the free spaces in the flat cage, and only one injection mold is necessary for manufacturing the cage windows.

Finally, according to a final feature in claim 9, there is provision that the axial cage is inserted into an axial part of a radial/axial roller bearing unit having an inner ring, coaxially with respect to which an outer ring is arranged, between which inner and outer rings rolling bodies roll in order to take up radial forces, and having cylindrical rolling bodies which are held in the axial cage and are arranged on both sides in order to take up axial forces, and the raceways of which are formed by the end face of the outer ring and by one washer disk each. Such combined radial/axial roller bearings are advantageously used for what are referred to as round table bearings which have a widespread field of application in machine tool manufacture.

Further features of the invention emerge from the following description and from the drawings in which an exemplary embodiment of the invention is illustrated in simplified form.

DETAILED DESCRIPTION OF THE DRAWINGS

Figure 1:
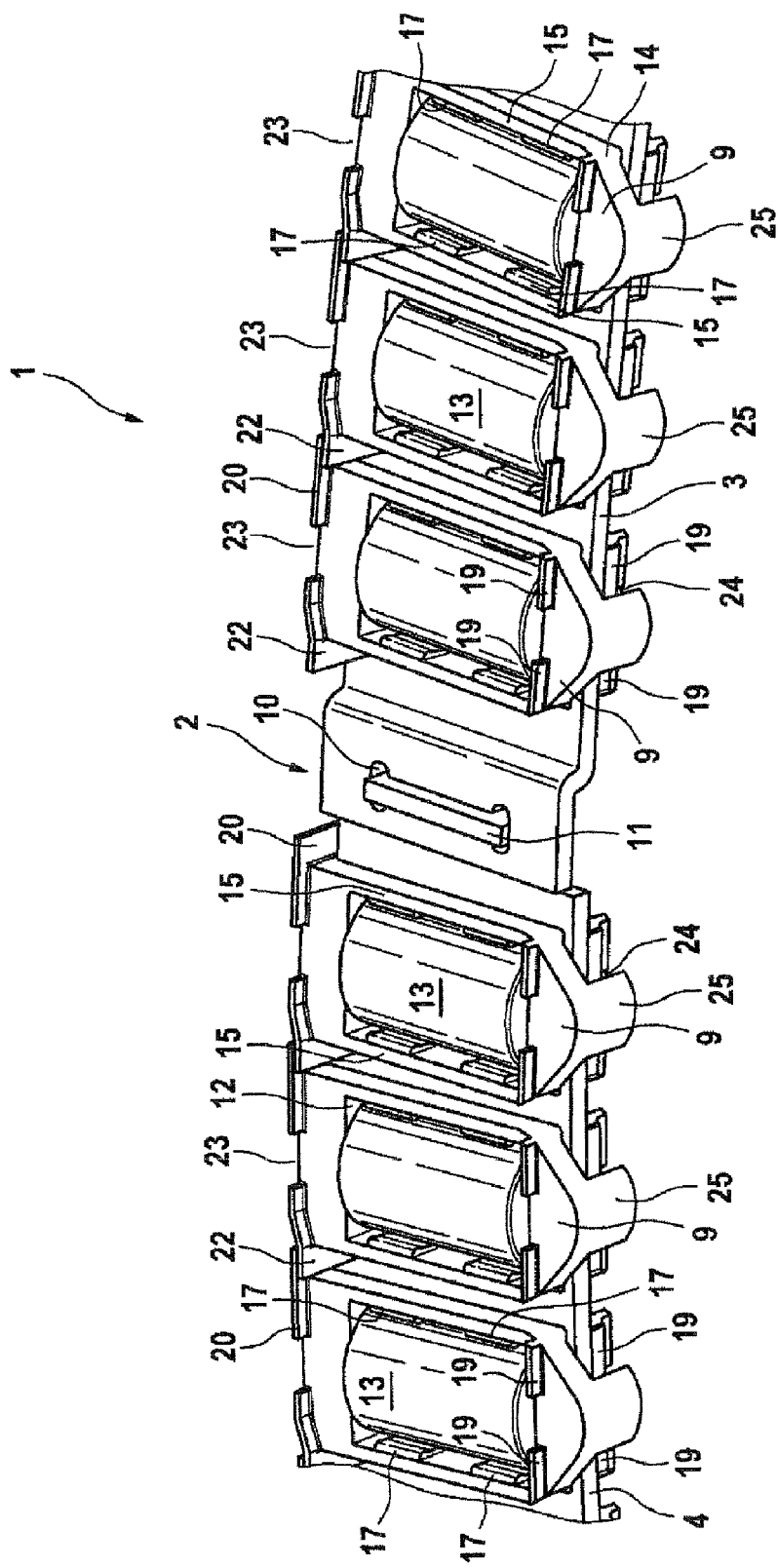
FIG. 1 is a partially perspective illustration of a multi-part axial cage according to the invention for a large-diameter roller bearing.
Figure 2:
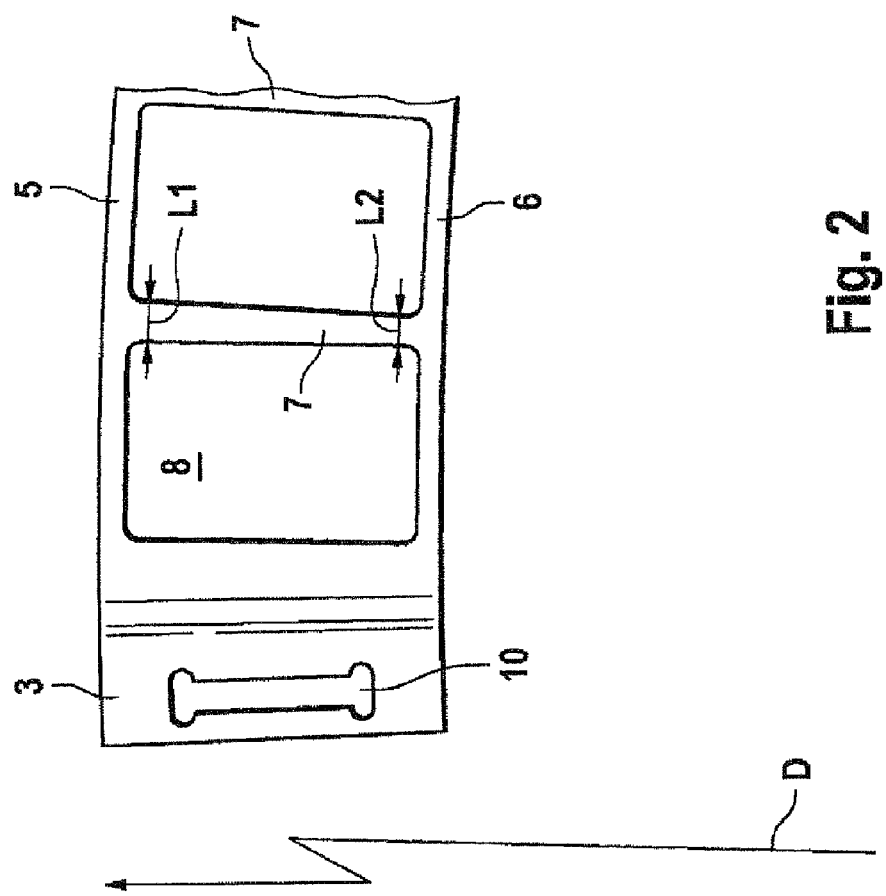
FIG. 2 shows a detail of a plan view of a flat cage in the form of an annular disk.

As is apparent from FIGS. 1 and 2, the axial cage 1 according to the invention for a large-diameter roller bearing is composed of the flat cage 2 in the form of an annular disk and the cage windows 9 which are fabricated from a plastic. The axial thickness of the flat cage in the form of an annular disk is to be set at approximately 2 mm in the exemplary embodiment, while the cage window 9 has an axial extent of approximately 12 mm in the outer region. The flat cage 2 in the form of an annular disk is in turn composed of the segments 3 and 4 which are connected to one another in a positively locking fashion. In the exemplary embodiment this is done in such a way that the projection 11 of the segment 4 engages in the recess 10 of the segment 3. The segments 3, 4 of the flat cage 2, which are advantageously manufactured by punching out, have, in turn, circular side rims 5, 6 which are connected to one another by webs 7. In this way, free spaces 8 are formed in the segments 3, 4, and the cage windows 9, which have pockets 12 for receiving the cylindrical rolling bodies 13, are in turn inserted into said free spaces 8.

As is shown by FIG. 2, the webs 7 of the flat cage 2 in the form of an annular disk extend conically from the outside to the inside in the radial direction, i.e. the circumferential extent L1 of the webs 7 in the outer region is greater than the circumferential extent L2 of the webs 7 in the inner region. This configuration of the webs 7 is necessary to ensure that, given different dimensioning D of the flat cages 2 in the form of an annular disk, the free spaces 8 of said flat cages 2 are always rectangular and are always of the same size, with the result that cage windows 9 of the same size can always be used. The advantage of this configuration variant is that, given a different cage diameter, the free spaces 8 always have the same geometric extent and, therefore, only one punching tool is necessary. Since the free spaces 8 are always the same given a different cage diameter D, the cage windows 9, which are inserted therein, are also always the same in their geometric extent and therefore, likewise, only one injection mold is necessary for said cage windows 9 when the cage diameter is different.

The plastic window 9, which is shown in various illustrations in FIGS. 3 to 8 is composed of the lateral walls 14, which are spaced apart from one another in the radial direction, and of the longitudinal walls 15 which are spaced apart from one another in the circumferential direction and which delimit the pockets 12, which are of rectangular design and are intended for receiving the rolling bodies 13. The longitudinal walls 15 which lie opposite one another, have securing lugs 16, 17, which lie opposite one another in the axial direction both at the top and at the bottom and are spaced apart from one another in the radial direction. In this way, the rolling bodies 13 are prevented from dropping out of the pockets 12 of the cage window 9 in both directions. Furthermore, the longitudinal walls 15 are provided with securing lugs 18, which lie diagonally opposite one another and serve to fix the cage window 9 to the flat cage 2 in the form of an annular disk by virtue of the fact that the securing lugs 18 are clipped behind the webs 7. As is also apparent from the Figures, the radially inner lateral wall 14 of the cage window 9 is respectively provided with two projections 19 spaced apart from one another at the upper end and with two projections 19 spaced apart from one another at the lower end, with the result that an intermediate space (not denoted in more detail) is arranged between said projections 19. Said intermediate space can be used as a reservoir space for an additional quantity of lubricant.

Figure 3:
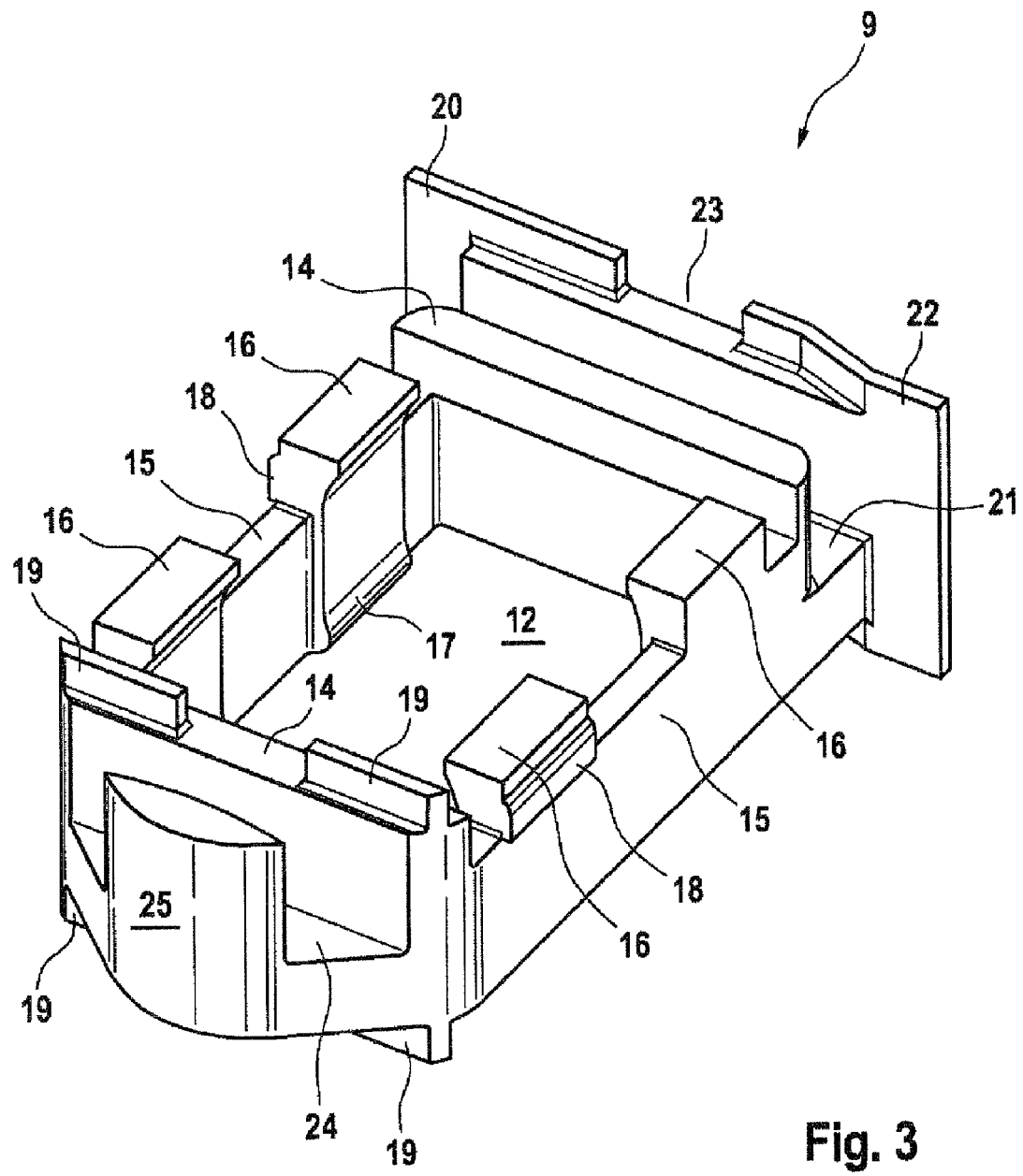
FIGS. 3 and 4 are a perspective illustration of a cage window according to the invention, from above and from below.
Figure 4:
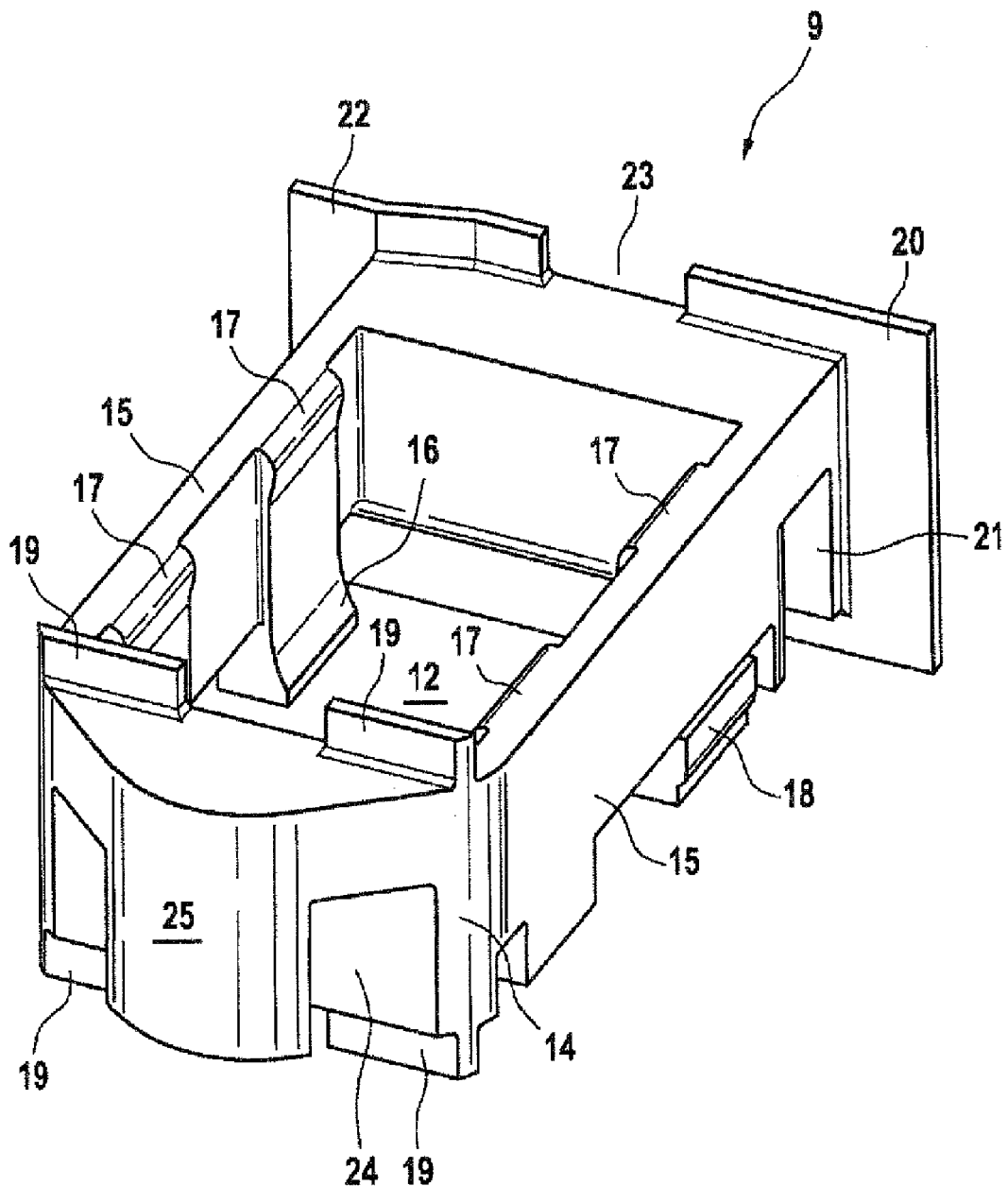
Figure 6:
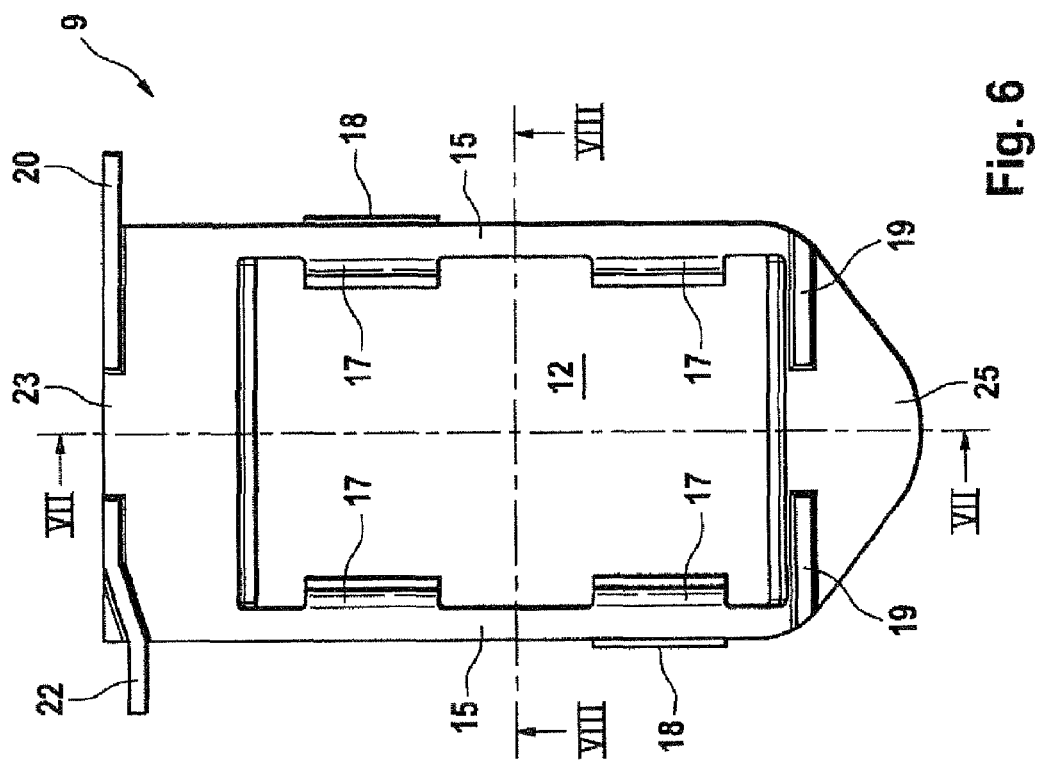
FIGS. 5 and 6 are a plan view of the cage window according to FIGS. 3 and 4.
Figure 5:
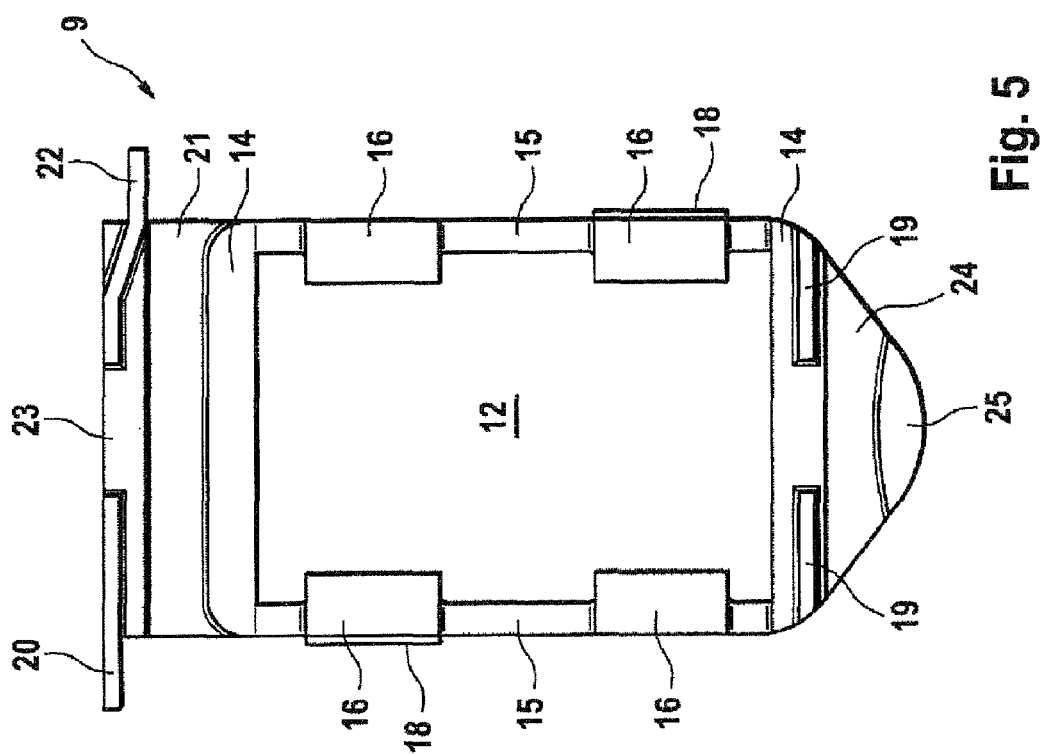
Figure 7:
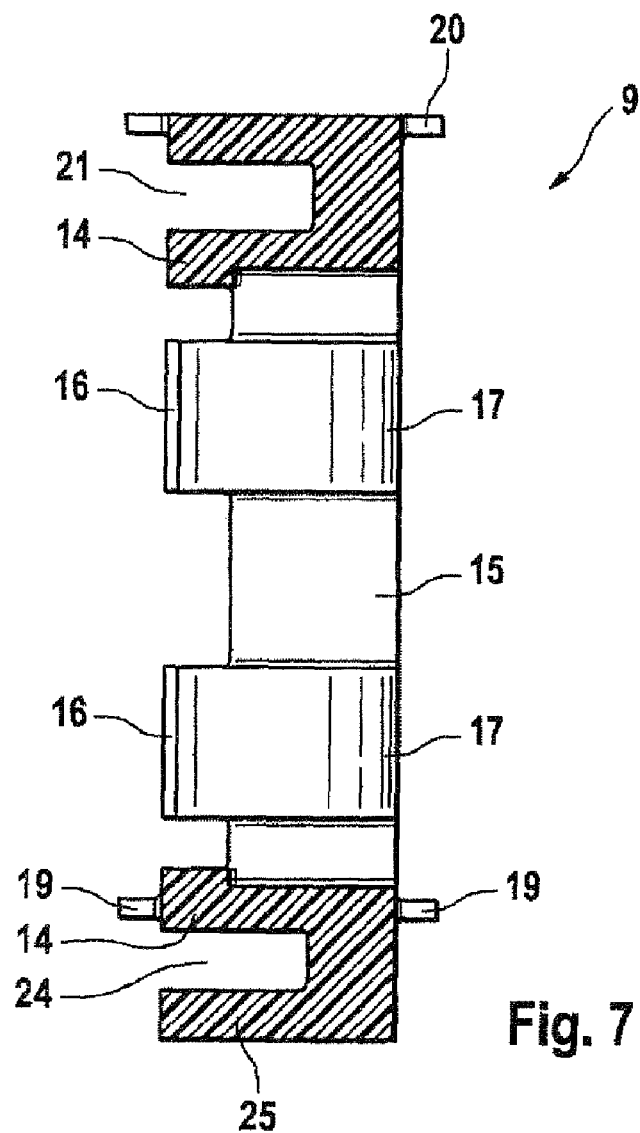
FIG. 7 shows a section along the line VII-VII in FIG. 6.
Figure 8:
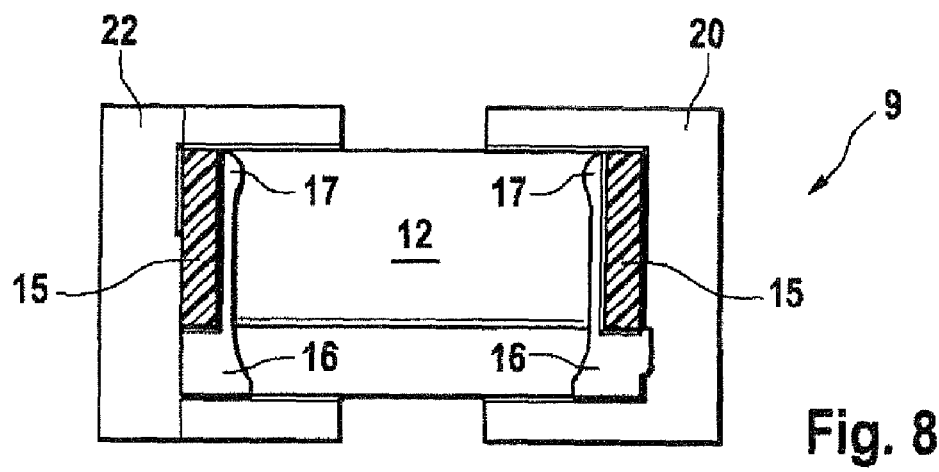
FIG. 8 shows a section along the line VIII-VIII in FIG. 6.

As can be seen in particular from FIGS. 3, 4 and 5, a sealing element in the form of a rectangular wall 20 adjoins in the region of the radially outer lateral wall 14. This wall 20 is separated from the lateral wall 14 by the groove 21. The wall 20 is equipped on one side with the radially inwardly offset step 22, with the result that the step 22 and wall 20 of two cage windows 9, which are arranged adjacently, overlap in the circumferential direction. This produces a satisfactorily acting seal. Reference is made once more to FIG. 1 at this point. In said Figure the overlap between the wall 20 and step 22 can be seen in the circumferential direction at the outer end of the cage 1. When the diameter D of the cage 1 is reduced, the overlap between the parts 20, 22 will reduce, but even with the smallest diameter D the overlap will always be such that no free gap is formed between two adjacent cage windows 9.

As is also apparent, the rectangular wall 20 is equipped with the centrally arranged recess 23 in the axial direction both at the top and at the bottom. As is also apparent from the abovementioned figures, the radially inner lateral wall 14 is connected via the groove 24 to the guide rim 25, which serves to center and guide the cage 1 radially. Said cage 1 is rounded at an abutting, metallic bearing part in order to set the lowest possible degree of friction. The flat cage 2 in the form of an annular disk and the cage windows 9 are then connected to, one another in such a way that the flat cage 2 engages with its side rims 5 and 6 in the grooves 21 and 24 of the cage window 9, with the fixed connection between the flat cage 2 and the cage windows 9 being implemented by the securing lugs 18 of the latter.

Figure 9:
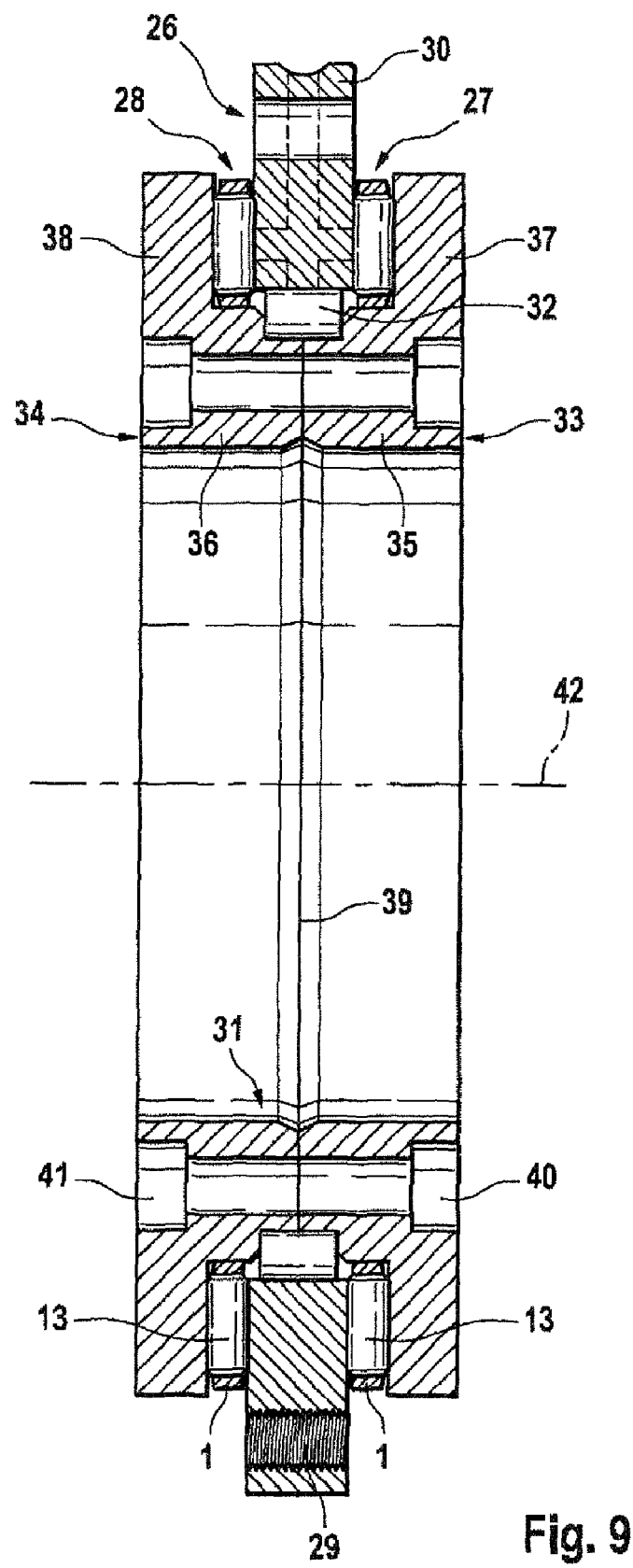
FIG. 9 shows a longitudinal section through a complete round table bearing.

FIG. 9 shows a radial/axial roller bearing unit in which the axial cage 1 described according to the invention can advantageously be used. Said radial/axial roller bearing unit is composed of the radial bearing 26 and the two axial bearings 27, 28 which are arranged next to the latter on the right and the left. The radial bearing 26 has the outer ring 30 which is provided with attachment bores 29, and the inner ring 31, which outer ring 30 and inner ring 31 are arranged spaced apart from one another coaxially, and cylinder rollers 32 therefore roll between them. The inner ring 31 is composed of the two component rings 33, 34, which are in turn composed of the axially extending parts 35, 36 and the two washer disks 37, 38 of the axial bearings 27, 28. The component rings 33, 34 have an L-shaped form and bear with their axially extending parts 35, 36 against one another at the dividing plane 39. This dividing plane 39 lies in the center of the inner raceway of the cylinder rollers 32, with the result that the two component rings 33, 34 are centered by the cylinder rollers 32, i.e. it is not possible for a radial offset to occur between the two axially extending parts 35, 36 of the component rings 33, 34. The component rings 33, 34 are also provided with attachment bores 40, 41 through which attachment screws (not illustrated) are plugged and therefore ensure secure cohesion of the bearing unit as a whole. Rolling bodies 13, which are guided in the cage 1 according to the invention, are associated with the two axial bearings 27, 28. The raceways (not denoted) of the two axial bearings 27, 28 are formed by the end faces of the outer ring 30, lying opposite one another, of the radial bearing 26 and by the two washer disks 37, 38, which are integrally connected to the axially extending part 35, 36 and which form, in the way already described, the L-shaped component rings 33, 34, which in turn form the inner ring 31. The bearing axis for the radial bearing 26 and the axial bearings 27, 28, which are arranged on the two sides, is provided with the reference symbol 42.

Figure 10:
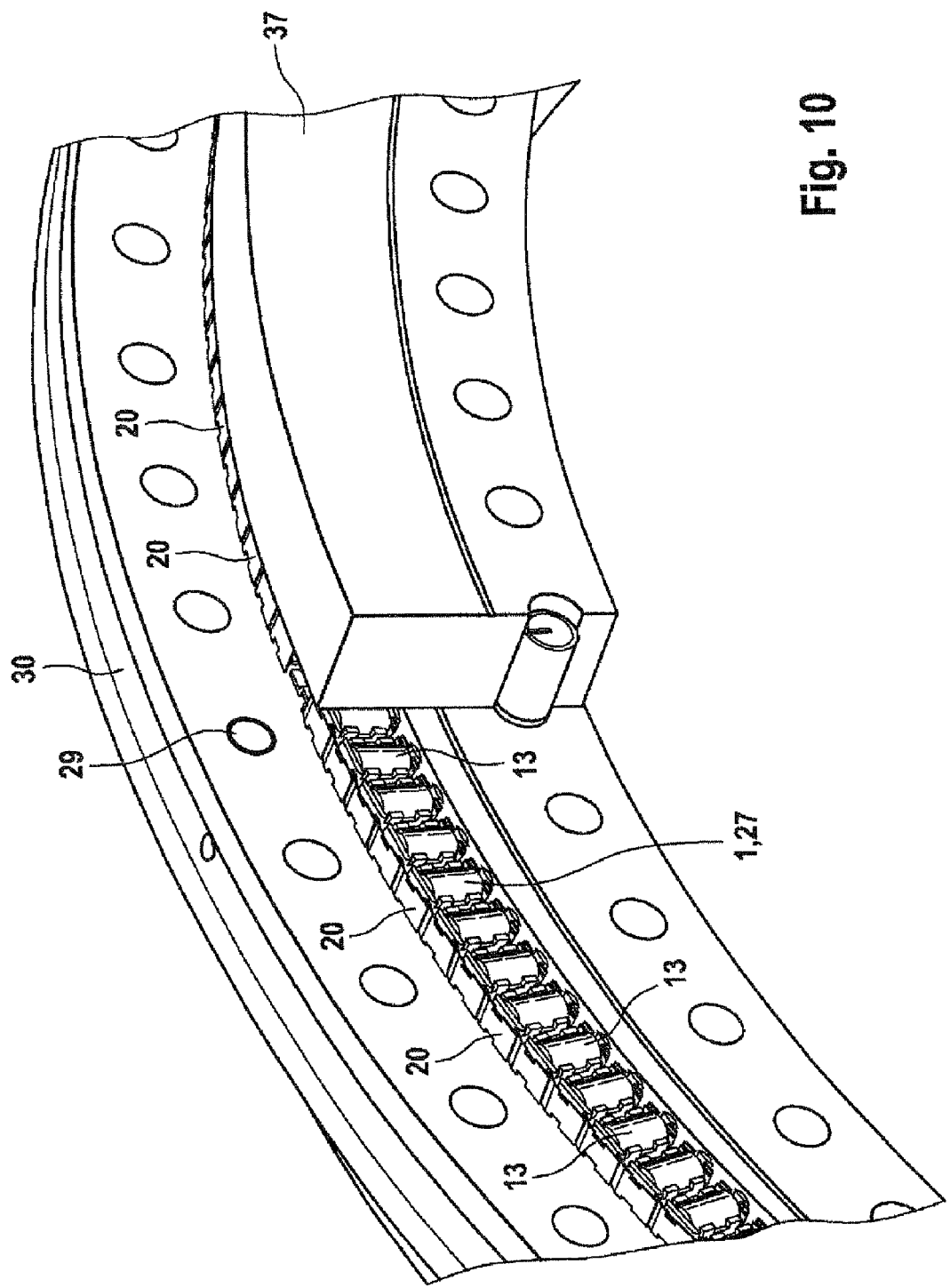
FIG. 10 is a partially perspective illustration of a round table bearing.

Finally, FIG. 10 shows a detail of a similar radial/axial roller bearing to that illustrated in FIG. 9. It is apparent that the axial bearing 27, which is arranged on the right-hand side, is configured with the axial cage 1 according to the invention, with the raceways for this axial roller bearing 27 being in turn formed by the end face of the outer ring 30 and by the washer disk 27. As is apparent, the axial gap between the end face of the outer ring 30 and washer disk 37 is reliably covered by the wall 20 of the axial cage 1. The illustration makes it clear that the favorable sliding properties of the plastics are utilized by the cage windows 9 to guide the rolling bodies and to reduce the friction, since metal/metal friction is prevented between the wall 20 and the raceways of the rolling bodies 13. In addition, the combination of disk-shaped flat cages 2 and plastic windows 9 ensures that a sufficiently stable cage 1 is formed.

LIST OF REFERENCE SYMBOLS

1 Axial cage
2 Flat cage in the form of an annular disk
3 Segment
4 Segment
5 Side rim
6 Side rim
7 Web
8 Free space
9 Cage window
10 Recess
11 Projection
12 Pocket
13 Rolling body
14 Lateral wall
15 Longitudinal wall
16 Securing lug
17 Securing lug
18 Securing lug
19 Projection
20 Wall
21 Groove
22 Step
23 Recess
24 Groove
25 Guide rim
26 Radial bearing
27 Axial bearing
28 Axial bearing
29 Attachment bore
30 Outer ring
31 Inner ring
32 Cylinder roller
33 Component ring
34 Component ring
35 Axially extending part
36 Axially extending part
37 Washer disk
38 Washer disk
39 Dividing plane
40 Attachment bore
41 Attachment bore
42 Bearing axis
D Diameter
L1 Circumferential extent
L2 Circumferential extent

The invention claimed is:

1. A multi-part axial cage for a large-diameter roller bearing, comprising:
a metal strip whose side rims, which are of a circular shape, are connected to one another by means of webs, resulting in free spaces being formed into which cage windows composed of a plastic with pockets for receiving rolling bodies are inserted,
wherein the cage windows are composed of longitudinal walls which are spaced apart from one another in a circumferential direction and lateral walls which are spaced apart from one another in a radial direction, and the cage windows have grooves which are spaced apart from one another in the radial direction and into which the side rims of the metal strip engage, and the cage windows have securing lugs for securing the rolling bodies, and a guide rim which bears against a bearing ring to guide the multi-part axial cage,
wherein the metal strip is a flat cage which is an annular disk, and the cage windows are each provided, at their end lying opposite the guide rim, with a sealing element which covers an axial gap formed between raceways of the rolling bodies, and
wherein the sealing element of the cage windows overlap in the circumferential direction.

2. The multi-part axial cage of claim 1, wherein the sealing element is embodied as a rectangular wall having a recess at ends lying opposite one another in an axial direction.

3. The multi-part axial cage of claim 2, wherein one of the rectangular walls of one of the cage windows has a radially offset step at one end in the circumferential direction, against which one of the rectangular walls of an adjacent cage window comes to bear, resulting in overlap between the step and the walls in the circumferential direction.

4. The multi-part axial cage of claim 1, wherein each of the longitudinal walls have one securing lug, which lie opposite one another and are intended for a positively locking connection to a free space of the flat cage.

5. The multi-part cage of claim 1, wherein the lateral walls are respectively provided with two projections spaced apart from one another at an axially upper end and with two projections spaced apart from one another at an axially lower end.

6. The multi-part axial cage of claim 1, wherein the flat cage is composed of at least two segments which are connected to one another in a positively locking fashion at their ends.

7. The multi-part axial cage of claim 6, wherein each of the segments have a projection at one end and a recess at the other end, which correlate with one another.

8. A series of multi-part axial cages of claim 1, wherein the multi-part axial cages have a different diameter and a circumferential extent of the webs is greater in a radially outer direction than a circumferential extent in a radially inner direction, wherein a geometric dimension of the free spaces of the flat cage and a geometric dimension of the cage windows are always identical irrespective of a diameter of the cage.

9. The multi-part axial cage claim 1, wherein the multi-part axial cage is inserted into an axial part of a radial/axial roller bearing unit having an inner ring, coaxially with respect to which an outer ring is arranged, between which the inner ring and the outer ring rolling bodies roll in order to take up radial forces, and having the cylindrical rolling bodies which are held in the multi-part axial cage and are arranged on both sides in order to take up axial forces, and the raceways of which are formed by end faces of the outer ring and by one washer disk each.

* * * * *